United States Patent
Fukumoto et al.

(10) Patent No.: US 6,692,409 B2
(45) Date of Patent: Feb. 17, 2004

(54) HYDRAULIC CHANGE SPEED SYSTEM FOR A WORKING VEHICLE

(75) Inventors: Toshiya Fukumoto, Sakai (JP); Akihisa Okano, Sakai (JP); Satoshi Machida, Sakai (JP); Akio Hattori, Osaka (JP)

(73) Assignee: Kubota Corporation, Osaka (JP)

( * ) Notice: Subject to any disclaimer, the term of this patent is extended or adjusted under 35 U.S.C. 154(b) by 101 days.

(21) Appl. No.: 09/795,674

(22) Filed: Feb. 28, 2001

(65) Prior Publication Data

US 2002/0119865 A1 Aug. 29, 2002

(51) Int. Cl.$^7$ .............................................. B60K 41/02
(52) U.S. Cl. .................... 477/174; 477/79; 477/154; 192/109 F
(58) Field of Search .............................. 475/117, 128; 477/76, 79, 80, 86, 98, 154, 174; 192/3.58, 87.13, 109 F

(56) References Cited

U.S. PATENT DOCUMENTS

| | | | |
|---|---|---|---|
| 4,576,062 A | * 3/1986 | Reppert et al. ............... | 477/30 |
| 4,781,080 A | * 11/1988 | Iwatsuki ..................... | 477/161 |
| 4,877,116 A | * 10/1989 | Horsch ...................... | 192/3.57 |
| 4,979,599 A | * 12/1990 | Nishida ...................... | 192/3.58 |
| 5,407,042 A | 4/1995 | Fukui et al. | |
| 5,460,577 A | * 10/1995 | Moroto et al. ............... | 475/123 |
| 5,501,642 A | * 3/1996 | Inuzuka et al. ............. | 477/107 |
| 5,666,863 A | * 9/1997 | Sunada et al. .............. | 74/731.1 |
| 5,957,807 A | * 9/1999 | Takamatsu et al. .......... | 477/156 |
| 5,992,255 A | * 11/1999 | Fujita et al. ................. | 477/98 |
| 5,992,590 A | * 11/1999 | Harries ...................... | 192/3.58 |
| 5,997,436 A | * 12/1999 | Shibuya et al. .............. | 477/117 |
| 6,007,458 A | * 12/1999 | Ohashi et al. ............... | 477/143 |
| 6,112,870 A | * 9/2000 | Fukumoto ................... | 192/3.58 |
| 6,318,530 B1 | * 11/2001 | Asada ..................... | 192/109 F |
| 6,350,214 B1 | * 2/2002 | Murasugi ..................... | 475/128 |
| 2001/0003322 A1 | * 6/2001 | Kon et al. .................. | 192/3.58 |
| 2001/0003722 A1 | * 6/2001 | Saito et al. ................. | 477/156 |
| 2001/0005705 A1 | * 6/2001 | Kon et al. ................... | 477/156 |

FOREIGN PATENT DOCUMENTS

| | | | |
|---|---|---|---|
| JP | 63312546 | 12/1988 | |
| JP | 5421254 | 1/1989 | |
| JP | 6440746 | 2/1989 | |
| JP | 7208595 | 8/1995 | |
| JP | 9240297 | 9/1997 | |
| JP | 200240692 A | * 9/2000 | ........... F16D/48/02 |
| JP | 200240778 A | * 9/2000 | ........... F16H/61/02 |
| JP | 2000247158 A | * 9/2000 | ........... B60K/17/06 |

* cited by examiner

Primary Examiner—Rodney H. Bonck
Assistant Examiner—David D. Le
(74) Attorney, Agent, or Firm—Webb Ziesenheim & Logsdon Orkin & Hanson, P.C.

(57) ABSTRACT

A hydraulic change speed system for a working vehicle includes a gear type change speed device shiftable by an actuator, a hydraulic clutch connected to a power transmission line including the gear type change speed device, a valve unit for switching operative states of the hydraulic clutch, a controller for controlling the valve unit, and a timer for measuring a shifting time of the gear type change speed device. The valve unit is interlocked to the actuator to be controllable to pressurize the hydraulic clutch rapidly for a predetermined time from a start of engagement of the hydraulic clutch and to pressurize the hydraulic clutch gradually the predetermined time. The controller sets the predetermined time based on the shifting time measured.

4 Claims, 7 Drawing Sheets

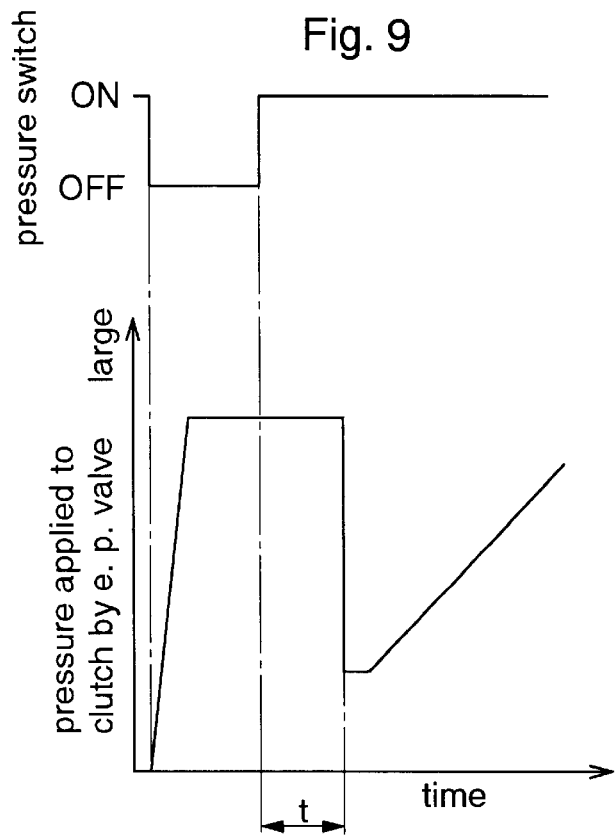
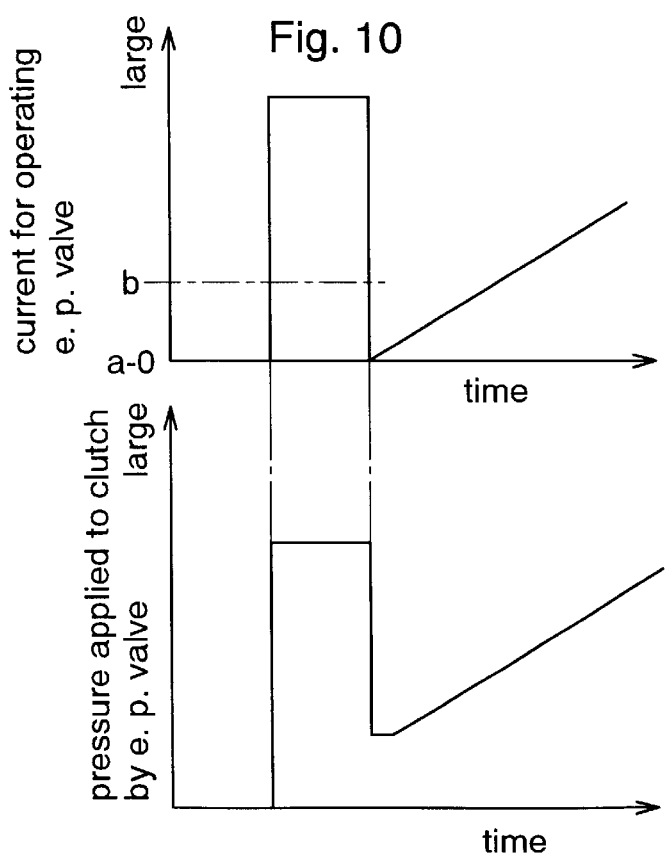

HYDRAULIC CHANGE SPEED SYSTEM FOR A WORKING VEHICLE

BACKGROUND OF THE INVENTION

1. Field of the Invention

This invention relates to a hydraulic change speed system for a working vehicle having a gear type change speed device shiftable by an actuator, a hydraulic clutch connected to a power transmission line including the gear type change speed device, a valve unit for switching operative states of the hydraulic clutch, and a controller for controlling the valve unit. In this hydraulic change speed system, the controller depressurizes the hydraulic clutch to begin disengaging the hydraulic clutch in response to a start of operation of the actuator, and pressurizes the hydraulic clutch to start engaging the hydraulic clutch in response to a finish of operation of the actuator. The operation of the valve unit is interlocked to the operation of the actuator. The hydraulic clutch is pressurized rapidly from for a set time from start of an operation to engage the hydraulic clutch, and pressurized gradually after the set time.

2. Description of the Related Art

In the hydraulic change speed system for a working vehicle noted above, the valve unit switches the hydraulic clutch in response to an operation of the actuator for shifting the gear type change speed device. This eliminates the trouble of manually operating the clutch to break power transmission temporarily during a gear shifting operation. Further, for the set time from the start of an operation to engage the hydraulic clutch, the controller increases the speed of pressuring the hydraulic clutch by the valve unit. A reduced time is required for engaging the hydraulic clutch, compared with the case of gradually pressuring the hydraulic clutch by the valve unit. After the set time, the controller controls the valve unit to pressurize the hydraulic clutch gradually, thereby suppress a shock occurring with a clutch engagement.

In such a mechanism for a working vehicle, an engaging operation of the hydraulic clutch is started upon completion of a gear shifting operation from neutral position when the vehicle is started. At this time, pressure oil is supplied to the hydraulic clutch completely empty of pressure oil. On the other hand, when an engaging operation of the hydraulic clutch is started upon completion of a gear shifting operation while the vehicle is running, pressure oil is supplied to the hydraulic clutch not completely empty of pressure oil. Thus, different quantities of pressure oil are required, after a shifting operation in time of starting the vehicle and after a shifting operation during a run, at an initial stage of an operation to engage the hydraulic clutch and immediately before a clutch engagement while reducing time consumed in engaging the hydraulic clutch.

Conventionally, the above set time is extended for a gear shifting operation performed when starting the vehicle, and shortened for a gear shifting operation performed during a run. After a shifting operation performed when starting the vehicle and after a shifting operation performed during a run, different quantities of pressure oil (pressurizing characteristics) are obtained during the set time at an initial stage of the operation to engage the hydraulic clutch from start of the clutch engaging operation. Depending on whether the shifting operation is performed when starting the vehicle or during a run, the time required after the shifting operation to engage the hydraulic clutch is appropriately shortened, while suppressing a shock occurring with a clutch engagement.

However, the quantity of pressure oil drained from the hydraulic clutch during a shifting operation carried out by operating the actuator is variable with the duration of the shifting operation and viscosity of the pressure oil. The quantity of pressure oil supplied to the hydraulic clutch per unit time after the shifting operation is variable with the viscosity and flow rate of the pressure oil. In the prior art noted above, only the set time is varied for a shifting operation performed when starting the vehicle and a shifting operation performed during a run. It is impossible to carry out an appropriate operation to engage the hydraulic clutch by taking the duration of the shifting operation and the viscosity and flow rate of pressure oil into account.

SUMMARY OF THE INVENTION

An object of this invention is to provide a hydraulic change speed system for a working vehicle having an excellent shifting performance with a hydraulic clutch engageable appropriately after a gear shifting operation, which is achieved by taking the duration of the shifting operation and the viscosity and flow rate of pressure oil into account, and considering various factors overlooked in conventional hydraulic change speed systems.

Another object of this invention is to reduce a dead time from completion of a shifting operation with a finish of actuator operation to a clutch engagement.

The above objects are fulfilled, according to this invention, by a hydraulic change speed system as noted in the outset hereof, comprising a time measuring device for measuring a shifting time of the gear type change speed device, wherein, based on the shifting time measured, the controller sets a predetermined time for pressurizing the hydraulic clutch rapidly from a start of engagement of the hydraulic clutch.

The longer time the shifting operation by the actuator takes, the longer time is consumed in the disengaging operation of the hydraulic clutch by the depressurizing action of the valve unit started with a start of operation of the actuator. This increases the quantity of pressure oil drained from the hydraulic clutch. A correspondingly increased quantity of pressure oil is needed to operate the hydraulic clutch appropriately until immediately before a clutch engagement during an initial stage of an operation to engage the hydraulic clutch. The system according to this invention takes this fact into account. The longer the time taken in the shifting operation is as measured by the time measuring device, the longer time is set by the controller for opening the valve unit. Thus, an increased quantity of pressure oil is obtained during the predetermined time. The quantity of clutch operating pressure oil increased with the length of time of the shifting operation is attained promptly for appropriately operating the hydraulic clutch until immediately before a clutch engagement. This effectively avoids a dead time produced by the opening degree of the valve unit restricted from a stage considerably before a clutch engagement to pressurize the hydraulic clutch gradually, which would occur where the predetermined time is fixed despite an extended time for shifting the gear type change speed device by the actuator.

Conversely, the shorter time the shifting operation by the actuator takes, the shorter time is consumed in the disengaging operation of the hydraulic clutch by the depressurizing action of the valve unit started with a start of operation of the actuator. This decreases the quantity of pressure oil drained from the hydraulic clutch. A correspondingly decreased quantity of pressure oil is needed to operate the hydraulic clutch appropriately until immediately before a clutch engagement during an initial stage of an operation to engage the hydraulic clutch. The shorter the time taken in the shifting operation is as measured by the time measuring device, the shorter time is set by the controller for opening the valve unit. Thus, a decreased quantity of pressure oil is obtained during the predetermined time. The quantity of clutch operating pressure oil decreased with the length of time of the shifting operation is attained promptly for appropriately operating the hydraulic clutch until immediately before a clutch engagement. This effectively avoids a shock produced by engagement of the hydraulic clutch occurring during the predetermined time where the predetermined time is fixed despite a shortened time for shifting the gear type change speed device by the actuator.

That is, in engaging the hydraulic clutch after a shifting operation of the gear type change speed device by the actuator, a varied quantity of pressure oil may be needed at an initial stage of the clutch engaging operation to operate the hydraulic clutch appropriately until immediately before a clutch engagement. However, with reference to the time taken in the shifting operation, the predetermined time for increasing the opening degree of the valve unit is set to a length for obtaining a necessary quantity of pressure oil at that time. As a result, regardless of variations in the shifting time, a shock is suppressed in time of a clutch engagement with increased effect while shortening the time required for engaging the hydraulic clutch appropriately.

Thus, the hydraulic change speed system for a working vehicle according to this invention has an excellent change speed performance, which takes lengths of time of shifting operations into account. After a shifting operation of the gear type change speed device by the actuator, the time required for engaging the hydraulic clutch is shortened appropriately, and a shock is suppressed in time of a clutch engagement with increased effect.

The foregoing objects are fulfilled, according to this invention, by a hydraulic change speed system as noted in the outset hereof, comprising an oil temperature measuring device for detecting a temperature of pressure oil in the hydraulic change speed system, the controller setting the predetermined time based on the temperature detected.

In a shifting operation performed when starting the tractor, in which the hydraulic clutch is only engaged by supplying pressure oil to the hydraulic clutch completely empty of pressure oil, when the temperature of pressure oil lowers to increase its viscosity, the pressure oil flows less easily and a less quantity of pressure oil is supplied to the hydraulic clutch per unit time. As a result, an extended time is required to obtain the quantity of pressure oil for appropriately operating the hydraulic clutch (and thus the pressure applied to the hydraulic clutch) until immediately before a clutch engagement. The system according to this invention takes this fact into account. The lower the temperature of pressure oil is as detected by the oil temperature measuring device, the longer time is set by the controller for opening the valve unit. Thus, the quantity of pressure oil (the pressure applied to the hydraulic clutch) is attained promptly for appropriately operating the hydraulic clutch until immediately before a clutch engagement. This effectively avoids a dead time produced by the opening degree of the valve unit restricted from a stage considerably before a clutch engagement to pressurize the hydraulic clutch gradually, which would occur where the predetermined time is fixed despite a high viscosity of pressure oil.

Conversely, when the temperature of pressure oil rises to decrease its viscosity, the pressure oil flows easily and an increased quantity of pressure oil is supplied to the hydraulic clutch per unit time. As a result, a reduced time is required to obtain the quantity of pressure oil for appropriately operating the hydraulic clutch (the pressure applied to the hydraulic clutch) until immediately before a clutch engagement. The higher the temperature of pressure oil is as detected by the oil temperature measuring device, the shorter time is set by the controller for opening the valve unit. Thus, the quantity of pressure oil (the pressure applied to the hydraulic clutch) is attained properly for appropriately operating the hydraulic clutch until immediately before a clutch engagement. This effectively avoids a shock produced by engagement of the hydraulic clutch occurring during the predetermined time where the predetermined time is fixed despite a low viscosity of pressure oil.

On the other hand, in a shifting operation performed during a run, which involves an operation to disengage the hydraulic clutch by draining pressure oil therefrom and an operation to engage the hydraulic clutch by supplying pressure oil thereto, the lower the temperature of pressure oil is, the less quantity of pressure oil drained from the hydraulic clutch per unit time and the less quantity of pressure oil is supplied to the hydraulic clutch per unit time. A quick operation is required in disengaging the hydraulic clutch, and thus the valve unit is opened to a large degree. When the hydraulic clutch is engaged, the valve unit is once adjusted to a small degree in order to prevent a shock occurring in time of clutch engagement. As a result, the viscosity of pressure oil affects its fluidity more in time of an engaging operation than in time of a disengaging operation. The lower the temperature of pressure oil is to result in the higher viscosity, the greater is the difference between the quantity of pressure oil drained from the hydraulic clutch per unit time during an operation to disengage the hydraulic clutch and the quantity of pressure oil supplied to the hydraulic clutch per unit time during an operation to engage the hydraulic clutch. An increased quantity of pressure oil is required for appropriately operating the hydraulic clutch until immediately before a clutch engagement. When the oil temperature measuring device detects a low temperature of pressure oil, the controller extends the predetermined time for increasing the opening degree of the valve unit to obtain an increased quantity of pressure oil during the predetermined time. In this way, the quantity of pressure oil is increased according to the difference between the quantity of pressure oil drained from the hydraulic clutch per unit time and the quantity of pressure oil supplied to the hydraulic clutch per unit time. The increased quantity of pressure oil is attained promptly for appropriately operating the hydraulic clutch until immediately before a clutch engagement. This effectively avoids a dead time produced by the opening degree of the valve unit restricted from a stage considerably before a clutch engagement to pressurize the hydraulic clutch gradually, which would occur where the predetermined time is fixed despite a high viscosity of pressure oil.

The higher the temperature of pressure oil is to result in the lower viscosity, the smaller is the difference between the quantity of pressure oil drained from the hydraulic clutch per unit time during an operation to disengage the hydraulic clutch and the quantity of pressure oil supplied to the hydraulic clutch per unit time during an operation to engage the hydraulic clutch. A decreased quantity of pressure oil is required for appropriately operating the hydraulic clutch until immediately before a clutch engagement. When the oil temperature measuring device detects a high temperature of pressure oil, the controller shortens the predetermined time for decreasing the opening degree of the valve unit to obtain a decreased quantity of pressure oil during the predetermined time. In this way, the quantity of pressure oil is decreased according to the difference between the quantity of pressure oil drained from the hydraulic clutch per unit time and the quantity of pressure oil supplied to the hydraulic clutch per unit time. The decreased quantity of pressure oil (i.e. pressure applied to the hydraulic clutch) is attained properly for appropriately operating the hydraulic clutch until immediately before a clutch engagement. This effectively avoids a shock produced by engagement of the hydraulic clutch occurring during the predetermined time where the predetermined time is fixed despite a low viscosity of pressure oil.

That is, in engaging the hydraulic clutch after a shifting operation of the gear type change speed device by the actuator, a varied quantity of pressure oil (i.e. clutch pressure) may be needed at an initial stage of the clutch engaging operation to operate the hydraulic clutch appropriately until immediately before a clutch engagement, or a varied time may be needed to obtain that quantity of pressure oil (i.e. clutch pressure). However, with reference to the viscosity of pressure oil determined from the temperature thereof, the predetermined time for increasing the opening degree of the valve unit is set to a length for obtaining a necessary quantity of pressure oil at that time. As a result, regardless of variations in the viscosity of pressure oil, a shock is suppressed in time of a clutch engagement with increased effect while shortening the time required for engaging the hydraulic clutch appropriately.

Thus, the hydraulic change speed system for a working vehicle according to this invention has an excellent change speed performance, which takes the viscosity of pressure oil into account. After a shifting operation of the gear type change speed device by the actuator, the time required for engaging the hydraulic clutch is shortened appropriately, and a shock is suppressed in time of a clutch engagement with increased effect.

The foregoing objects are fulfilled, according to this invention, by a hydraulic change speed system as noted in the outset hereof, comprising a speed measuring device for detecting a speed of an engine that drives a hydraulic pump to produce a hydraulic pressure for the hydraulic change speed system, the controller setting the predetermined time based on the speed detected.

The lower the engine speed is, the hydraulic pump delivers pressure oil at the lower flow rate. An extended time is required to obtain the quantity of pressure oil at an initial stage of an operation to engage the hydraulic clutch, for appropriately operating the hydraulic clutch until immediately before a clutch engagement. The system according to this invention takes this fact into account. The lower the engine speed is as detected by the speed measuring device, the longer time is set by the controller for opening the valve unit. Thus, the quantity of pressure oil is attained promptly for appropriately operating the hydraulic clutch until immediately before a clutch engagement. This effectively avoids a dead time produced by the opening degree of the valve unit restricted from a stage considerably before a clutch engagement to pressurize the hydraulic clutch gradually, which would occur where the predetermined time is fixed despite a low flow rate of pressure oil.

Conversely, when the engine speed increases, the hydraulic pump delivers pressure oil at an increased flow rate. As a result, a reduced time is required to obtain the quantity of pressure oil for appropriately operating the hydraulic clutch until immediately before a clutch engagement. The higher the engine speed is as detected by the speed measuring device, the shorter time is set by the controller for opening the valve unit. Thus, the quantity of pressure oil (the pressure applied to the hydraulic clutch) is attained properly for appropriately operating the hydraulic clutch until immediately before a clutch engagement. This effectively avoids a shock produced by engagement of the hydraulic clutch occurring during the predetermined time where the predetermined time is fixed despite an increased flow rate of pressure oil.

That is, in engaging the hydraulic clutch after a shifting operation of the gear type change speed device by the actuator, a varied quantity of pressure oil may be needed at an initial stage of the clutch engaging operation to operate the hydraulic clutch appropriately until immediately before a clutch engagement. However, with reference to the engine speed, the predetermined time for increasing the opening degree of the valve unit is set to a length for obtaining a necessary quantity of pressure oil at that time. As a result, regardless of variations in the quantity of pressure oil supplied from the hydraulic pump, a shock is suppressed in time of a clutch engagement with increased effect while shortening the time required for engaging the hydraulic clutch appropriately.

This invention proposes a system having at least two features selected from three features consisting of a feature of the controller setting the predetermined time based on the shifting time measured, the controller setting the predetermined time based on the temperature detected, and the controller setting the predetermined time based on the engine speed detected. This system suppresses a shock in time of a clutch engagement with increased effect while shortening the time required for engaging the hydraulic clutch appropriately.

Further, this invention proposes a system in which, immediately after the predetermined time, the controller once reduces a valve controlling current value for the valve unit below a valve controlling current value for adjusting the valve unit to realize a target pressurizing characteristic for obtaining an appropriate engaging pressure for the hydraulic clutch.

In this system, the valve controlling current value for the valve unit is reduced below the valve controlling current value for adjusting the valve unit, immediately after the predetermined time, to realize a target pressurizing characteristic for obtaining an appropriate engaging pressure for the hydraulic clutch. A correspondingly increased operating force is applied to throttle the valve unit immediately after the predetermined time. A sufficient force is thereby secured to act against the spool of the valve unit sticking to a valve wall due to the viscosity of oil during the predetermined time for operating the valve unit with a rapid pressurizing characteristic. Consequently, the valve unit may be throttled promptly immediately after the predetermined time.

As a result, the operation to throttle the valve unit is carried out, immediately after the predetermined time, without a delay caused by the spool of the valve unit sticking to the valve wall due to the viscosity of oil. This avoids an inconvenience that the hydraulic clutch is engaged to generate a shock at a stage where a large quantity of pressure oil is supplied to the hydraulic clutch in the course of throttling the valve unit from a large opening degree to the target opening degree. A shock is prevented from occurring in time of clutch engagement due to the spool sticking to the valve wall.

With the suppression of a delay in the operation to throttle the valve unit due to the spool sticking to the valve wall, the predetermined time need not be extended for operating the valve unit work (i.e. increasing the opening degree of the valve unit) with the rapid pressuring characteristic. The time required for engaging the hydraulic clutch does not become long.

Thus, a shock is suppressed in time of clutch engagement due to the spool sticking to the valve wall while shorting the time required for engaging the hydraulic clutch.

Further, as a preferred embodiment, immediately after the predetermined time, the controller may once reduce the valve controlling current value for the valve unit to zero. Then, a maximum operating force is applied to throttle the valve unit immediately after the predetermined time. A sufficient force is thereby secured to act against the spool sticking to the valve wall due to the viscosity of oil. Consequently, the valve unit may be throttled promptly immediately after the predetermined time.

Further, the foregoing objects are fulfilled, according to this invention, by a hydraulic change speed system as noted in the outset hereof, in which the valve unit includes a selector valve for switching pressure oil supply lines to the hydraulic clutch, and an electromagnetic proportional valve for adjusting pressurizing characteristics for the hydraulic clutch, the electromagnetic proportional valve being connected in series to and upstream of the selector valve on an oil line extending from the hydraulic pump to the hydraulic clutch, the controller causing the electromagnetic proportional valve to start pressurizing the hydraulic clutch before a finish of operation of the actuator.

In the system according to this invention, the controller opens the electromagnetic proportional valve before a finish of operation of the actuator. Thus, when the selector valve is switched to a pressure oil supplying position to engage the hydraulic clutch in response to an end of operation of the actuator, the hydraulic clutch is immediately supplied with pressure oil at a high flow rate corresponding to the electromagnetic proportional valve operating with a rapid pressure characteristic. That is, the quantity of pressure oil to be supplied to the hydraulic clutch is not limited while the electromagnetic proportional valve is opened, which is the case when the electromagnetic proportional valve is opened after switching the selector valve to the pressure oil supplying position. A correspondingly reduced dead time occurs from completion of a shifting operation when the operation of the actuator ends to the clutch engagement. A reduction in vehicle speed in time of a shifting operation may be suppressed, effectively to suppress a shock occurring in time of a clutch engagement.

In a preferred embodiment, this system further comprises a speed discriminating device for determining a speed provided by the change speed device, wherein the controller is operable, based on a result of discrimination by the speed discriminating device, to vary a target pressurizing characteristic with which the electromagnetic proportional valve pressurizes the hydraulic clutch before the finish of operation of the actuator.

A certain speed stage may require a different shifting time. Then, a different quantity of pressure oil is drained from the hydraulic clutch during the shifting operation. As a result, a different quantity of pressure oil is needed for engaging the hydraulic clutch. Taking this aspect into account, the larger the quantity of pressure oil is drained from the hydraulic clutch during the shifting operation, the controller sets the more rapid target pressurizing characteristic for the electromagnetic proportional valve before an end of operation of the actuator, to increase the quantity of pressure oil supplied to the hydraulic clutch per unit time. Thus, regardless of speed stages, a sufficient quantity of pressure oil is secured during the predetermined time for appropriately operating the hydraulic clutch until immediately before a clutch engagement. This effectively avoids an inconvenience that, depending on a speed stage, the hydraulic clutch cannot be operated promptly during the predetermined time until immediately before a clutch engagement, resulting in an extended dead time from completion of a shifting operation when the operation of the actuator ends to a clutch engagement.

As a further preferred embodiment of the invention, the system may further comprise an oil temperature measuring device for detecting a engine speed in the hydraulic change speed system, wherein the controller is operable, based on the temperature detected by the oil temperature measuring device, to vary a target pressurizing characteristic with which the electromagnetic proportional valve pressurizes the hydraulic clutch before the finish of operation of the actuator. Then, the system has an excellent change speed performance, capable of reducing the dead time from completion of a shifting operation when the operation of the actuator ends to a clutch engagement, regardless of the temperature of pressure oil.

The system may further comprising a speed measuring device for detecting a speed of an engine that drives the hydraulic pump, wherein the controller is operable, based on the speed detected by the speed measuring device, to vary a target pressurizing characteristic with which the electromagnetic proportional valve pressurizes the hydraulic clutch before the finish of operation of the actuator. Then, the system has an excellent change speed performance, capable of reducing the dead time from completion of a shifting operation when the operation of the actuator ends to a clutch engagement, regardless of engine speed.

In a further preferred embodiment of the invention, the system further comprises a state discriminating device for determining whether the working vehicle is being started or already running, wherein the controller is operable, based on a result of discrimination by the state discriminating device, to vary a target pressurizing characteristic with which the electromagnetic proportional valve pressurizes the hydraulic clutch before the finish of operation of the actuator.

In a shifting operation performed during a run, pressure oil is supplied to the hydraulic clutch not completely empty of pressure oil. In a shifting operation performed when starting the vehicle, pressure oil is supplied to the hydraulic clutch completely empty of pressure oil. Taking this aspect into account, when starting the vehicle, the controller controls the electromagnetic proportional valve with a more rapid target pressurizing characteristic than when the vehicle is running, to increase the quantity of pressure oil supplied to the hydraulic clutch per unit time. Thus, whether the vehicle is being started or is already running, the hydraulic clutch is operated reliably during the predetermined time until immediately before a clutch engagement. This effectively avoids an inconvenience occurring in time or starting the vehicle, in which the hydraulic clutch cannot be operated properly during the predetermined time until immediately before a clutch engagement, and the opening degree of the electromagnetic proportional valve restricted from a stage considerably before the clutch engagement, resulting in an extended dead time from completion of a shifting operation when the operation of the actuator ends to the clutch engagement.

Other features and advantages of this invention will be apparent from the following description of the embodiments to be taken with reference to the drawings.

BRIEF DESCRIPTION OF THE DRAWINGS

FIG. 9 is a view showing timing of opening the electromagnetic proportional valve;

FIG. 10 is a view showing a relationship between pressures applied to the hydraulic clutch by the electromagnetic proportional valve and current values for opening the valve.

DESCRIPTION OF THE PREFERRED EMBODIMENTS

Figure 1:
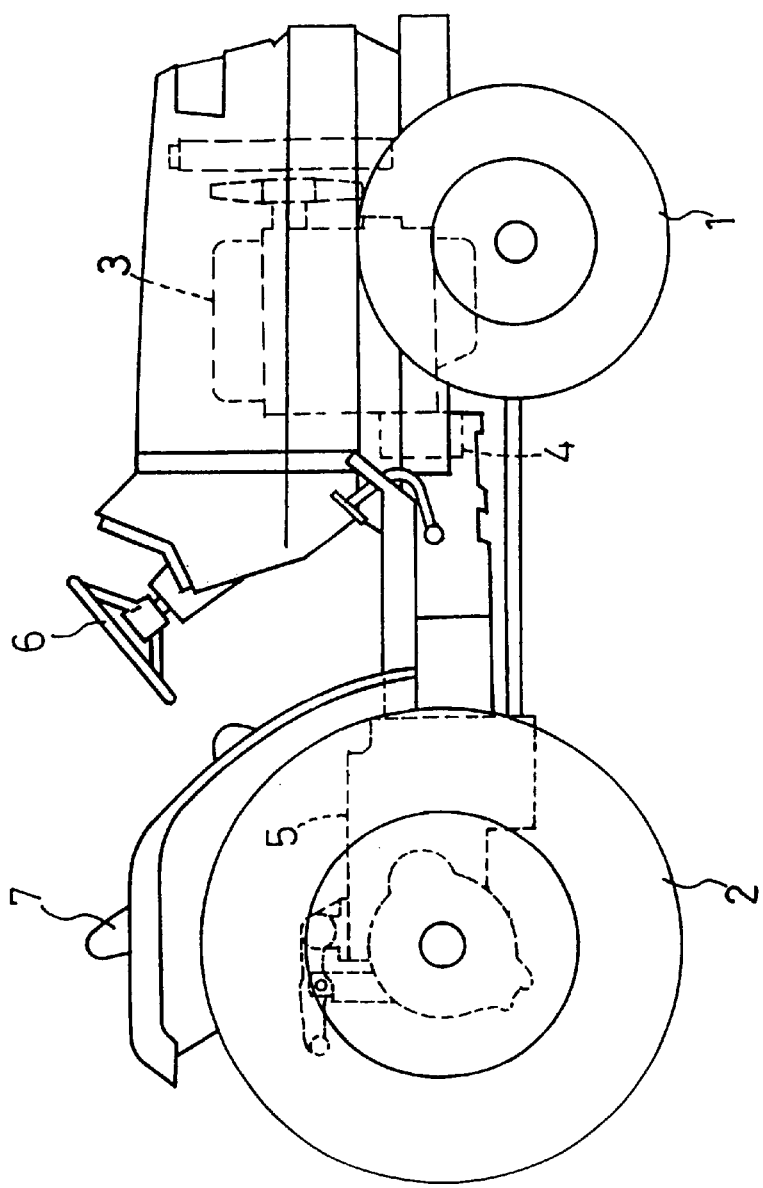
FIG. 1 is a side elevation of a tractor.

FIG. 1 shows a side elevation a tractor which is one example of working vehicles. The tractor includes right and left front wheels 1 and rear wheel 2, an engine 3 mounted on a front portion, a pedal-operated main clutch 4 a transmission case 5 acting also as a rear frame, a steering wheel 6 for steering the front wheels 1, and a driver's seat 7.

Figure 2:
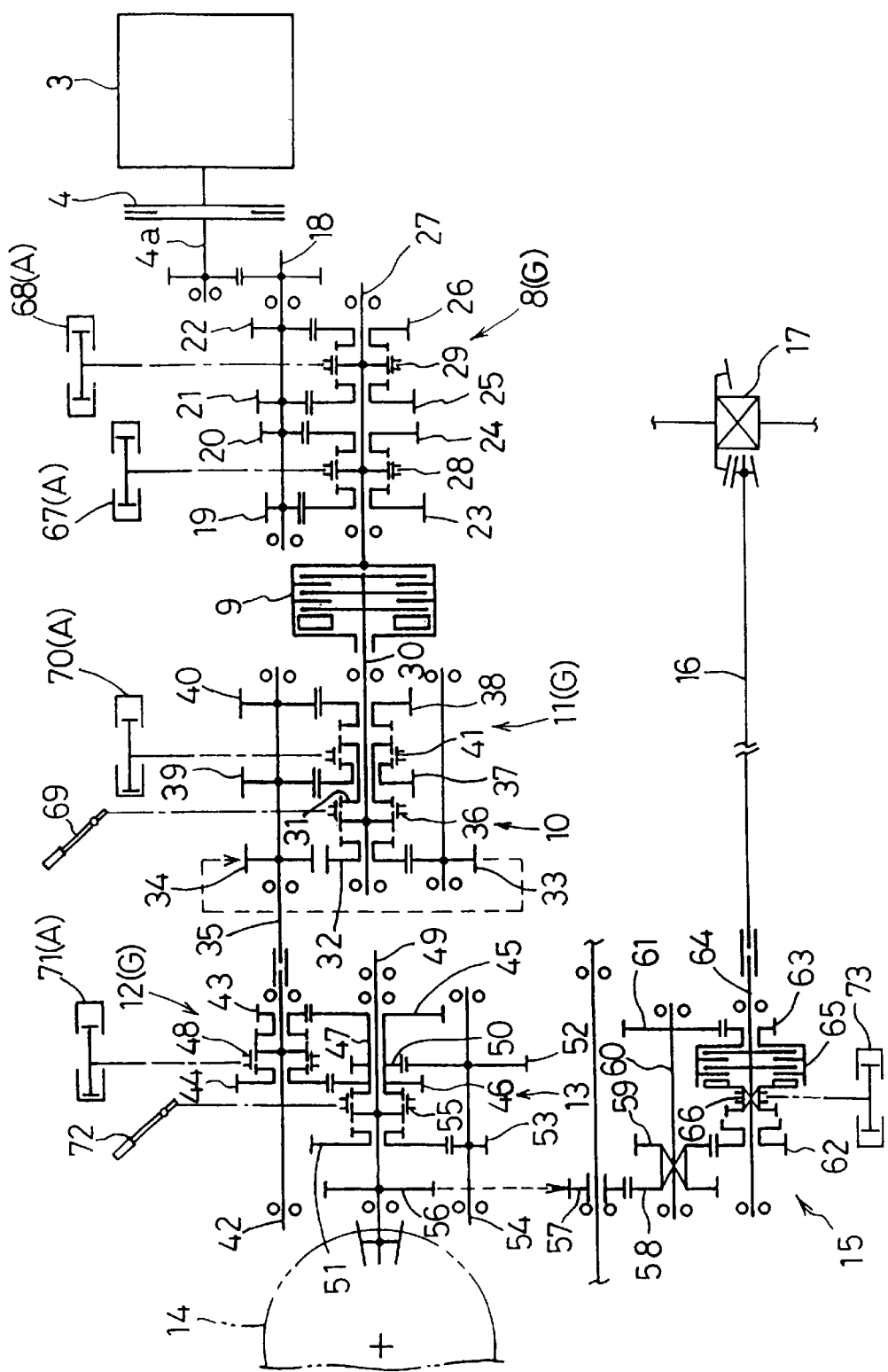
FIG. 2 is a schematic view of a transmission structure in a propelling change speed system.

As shown in FIG. 2, the transmission case 5 contains a main change speed device 8 for receiving drive from the engine 3 through the main clutch 4 and outputting four speeds, a multidisk type hydraulic clutch 9 for connecting and disconnecting drive from the main change speed device 8, a forward/backward changeover device 10 for switching the drive transmitted from the main change speed device 8 through the hydraulic clutch 9 between forward drive and backward drive, a supplementary change speed device 11 for receiving forward drive from the forward/backward changeover device 10 and providing two speeds, an auxiliary change speed device 12 for receiving backward drive from the forward/backward changeover device 10 or forward drive from the supplementary change speed device 11 and providing two speeds, a super-reduction device 13 for reducing drive from the auxiliary change speed device 12 by a large gear ratio, a rear differential 14 for transmitting drive from the super-reduction device 13 to the right and left rear wheels 2, and a front wheel change speed device 15 for transmitting drive from the super-reduction device 13, with or without acceleration, to the right and left front wheels 1. The drive from the front wheel change speed device 15 is transmitted to the right and left front wheels 1 through a transmission shaft 16 and a front differential 17.

The main change speed device 8 includes an input shaft 18 interlocked to an output shaft 4a of main clutch 4, a first drive gear 19, a second drive gear 20, a third drive gear 21 and a fourth drive gear 22 mounted on the input shaft 18 to be rotatable therewith, a first driven gear 23 meshed with the first drive gear 19, a second driven gear 24 meshed with the second drive gear 20, a third driven gear 25 meshed with the third drive gear 21, a fourth driven gear 26 meshed with the fourth drive gear 22, an output shaft 27 for rotatably supporting the driven gears 23–26, a first shift member 28 of the synchromesh type switchable between a first speed position for interlocking the output shaft 27 to the first driven gear 23, a second speed position for interlocking the output shaft 27 to the second driven gear 24, and a neutral position for disconnecting the output shaft 27 from the first driven gear 23 and second driven gear 24, and a second shift member 29 of the synchromesh type switchable between a third speed position for interlocking the output shaft 27 to the third driven gear 25, a fourth speed position for interlocking the output shaft 27 to the fourth driven gear 26, and a neutral position for disconnecting the output shaft 27 from the third driven gear 25 and fourth driven gear 26.

With this construction, when the first shift member 28 and second shift member 29 are placed in the neutral positions, the main change speed device 8 produces a neutral state not transmitting drive from the input shaft 18 to the output shaft 27. When the first shift member 28 is placed in the first speed position, with the second shift member 29 placed in the neutral position, the main change speed device 8 produces a first transmission state for transmitting drive from the input shaft 18 to the output shaft 27 at low speed. When the first shift member 28 is placed in the second speed position, with the second shift member 29 placed in the neutral position, the main change speed device 8 produces a second transmission state for transmitting drive from the input shaft 18 to the output shaft 27 at a higher speed than in the first transmission state. When the second shift member 29 is placed in the third speed position, with the first shift member 28 placed in the neutral position, the main change speed device 8 produces a third transmission state for transmitting drive from the input shaft 18 to the output shaft 27 at a higher speed than in the second transmission state. When the second shift member 29 is placed in the fourth speed position, with the first shift member 28 placed in the neutral position, the main change speed device 8 produces a fourth transmission state for transmitting drive from the input shaft 18 to the output shaft 27 at a higher speed than in the third transmission state.

The hydraulic clutch 9 is engaged, by pressure oil supplied thereto, to transmit drive from the main change speed device 8 to the forward/backward changeover device 10. The hydraulic clutch 9 is disengaged, with pressure oil drained therefrom, not to transmit drive from the main change speed device 8 to the forward/backward changeover device 10.

The forward/backward changeover device 10 includes an input shaft 30 interlocked to the output shaft 27 of main change speed device 8 through the hydraulic clutch 9, a tubular shaft 31 and a drive gear 32 freely rotatably mounted on the input shaft 30, a driven gear 34 interlocked to the drive gear 32 through a reversing gear 33, an output shaft 35 rotatable with the driven gear 34, and a shift member 36 of the synchromesh type switchable between a forward position for interlocking the tubular shaft 31 to the input shaft 30 and a backward position for interlocking the drive gear 32 to the input shaft 30.

With this construction, when the shift member 36 is placed in the forward position, the forward/backward changeover device 10 produces a forward drive state for transmitting drive from the input shaft 30 to the tubular shaft 31 as forward drive. When the shift member 36 placed in the backward position, the forward/backward changeover device 10 produces a backward drive state for transmitting drive from the input shaft 30 to the tubular shaft 31 as backward drive.

The supplementary change speed device 11 includes a high-speed drive gear 37 freely rotatably mounted on the tubular shaft 31 of forward/backward changeover device 10, a low-speed drive gear 38 freely rotatably mounted on the input shaft 30 of forward/backward changeover device 10, a high-speed driven gear 39 meshed with the high-speed drive gear 37, a low-speed driven gear 40 meshed with the low-speed drive gear 38, an output shaft 35 rotatable with the high-speed driven gear 39 and low-speed driven gear 40, and a shift member 41 of the synchromesh type switchable between a high-speed position for interlocking the high-speed drive gear 37 to the tubular shaft 31 and a low-speed position for interlocking the low-speed drive gear 38 to the tubular shaft 31.

With this construction, when the shift member 41 is placed in the high-speed position, the supplementary change speed device 11 produces a high-speed forward transmission state for transmitting drive from the tubular shaft 31 of forward/backward changeover device 10 to the output shaft 35 as high-speed forward drive. When the shift member 41 is placed in the low-speed position, the supplementary change speed device 11 produces a low-speed forward transmission state for transmitting drive from the tubular shaft 31 of forward/backward changeover device 10 to the output shaft 35 as low-speed forward drive.

The auxiliary change speed device 12 includes an input shaft 42 interlocked to the common output shaft 35 of forward/backward changeover device 10 and supplementary change speed device 11, a low-speed drive gear 43 and a high-speed drive gear 44 freely rotatably mounted on the input shaft 42, a low-speed driven gear 45 meshed with the low-speed drive gear 43, a high-speed driven gear 46 meshed with the high-speed drive gear 44, a tubular shaft 47 rotatable with the low-speed driven gear 45 and high-speed driven gear 46, and a shift member 48 of the synchromesh type switchable between a low-speed position for interlocking the low-speed drive gear 43 to the input shaft 42 and a high-speed position for interlocking the high-speed drive gear 44 to the input shaft 42.

With this construction, when the shift member 48 is placed in the low-speed position, the auxiliary change speed device 12 produces a low-speed transmission state for transmitting drive from the input shaft 42 to the tubular shaft 47 at low speed. When the shift member 48 is placed in the high-speed position, the auxiliary change speed device 12 produces a high-speed transmission state for transmitting drive from the input shaft 42 to the tubular shaft 47 at high speed.

The super-reduction device 13 includes an output shaft 49 rotatably supporting the tubular shaft 47 of auxiliary change speed device 12, a reduction drive gear 50 rotatable with the tubular shaft 47 of auxiliary change speed device 12, a reduction driven gear 51 freely rotatably mounted on the output shaft 49, a first relay gear 52 meshed with the reduction drive gear 50, a second relay gear 53 meshed with the reduction driven gear 51, a relay shaft 54 rotatable with the first relay gear 52 and second relay gear 53, and a shift member 55 of the synchromesh type switchable between a non-reduction position for interlocking the output shaft 49 to the tubular shaft 47 of auxiliary change speed device 12 and a super-reduction position for interlocking the output shaft 49 to the reduction driven gear 51.

With this construction, when the shift member 55 is placed in the non-reduction position, the super-reduction device 13 produces a non-reducing transmission state for transmitting drive from the tubular shaft 47 of auxiliary change speed device 12 to the output shaft 49 without deceleration. When the shift member 55 is placed in the super-reduction position, the super-reduction device 13 produces a non-reducing transmission state for transmitting drive from the tubular shaft 47 of auxiliary change speed device 12 to the output shaft 49 with a substantial deceleration.

The rear differential 14 is interlocked to the output shaft 49 of super-reduction device 13, and transmits drive from the output shaft 49 to the right and left rear wheels 2.

The front wheel change speed device 15 includes an input gear 58 interlocked through a relay gear 57 to a transmission gear 56 rotatable with the output shaft 49 of super-reduction device 13, an equal-speed drive gear 59 rotatable with the input gear 58, an accelerating drive gear 61 rotatable with the input gear 58 through an input shaft 60, an equal-speed driven gear 62 meshed with the equal-speed drive gear 59, an accelerating driven gear 63 meshed with the accelerating drive gear 61, an output shaft 64 freely rotatably supporting the equal-speed driven gear 62 and accelerating driven gear 63, a multidisk type friction clutch 65 disposed between the accelerating driven gear 63 and output shaft 64, and a shift member 66 switchable between an equal speed position for interlocking the output shaft 64 to the equal-speed driven gear 62, a front wheel accelerating position for engaging the friction clutch 65 to interlock the output shaft 64 to the accelerating driven gear 63, and a neutral position for disconnecting the output shaft 64 from the equal-speed driven gear 62 and accelerating driven gear 63. The equal-speed drive gear 59 and equal-speed driven gear 62 have a gear ratio for rotating the front wheels 1 at substantially the same peripheral speed as the rear wheels 2. The accelerating drive gear 61 and accelerating driven gear 63 have a gear ratio for rotating the front wheels 1 at a higher peripheral speed than the rear wheels 2.

With this construction, when the shift member 66 is placed in the equal-speed position, the front wheel change speed device 15 produces a standard four-wheel drive state for transmitting drive from the input gear 58 to the output shaft 64 to rotate the front wheels 1 at substantially the same peripheral speed as the rear wheels 2. When the shift member 66 is placed in the front wheel accelerating position, the front wheel change speed device 15 produces a front wheel accelerating four-wheel drive state for transmitting drive from the input gear 58 to the output shaft 64 to rotate the front wheels 1 at a higher peripheral speed than the rear wheels 2. When the shift member 66 is placed in the neutral position, the front wheel change speed device 15 produces a rear wheel drive state for breaking drive transmission from the input gear 58 to the output shaft 64.

Figure 3:
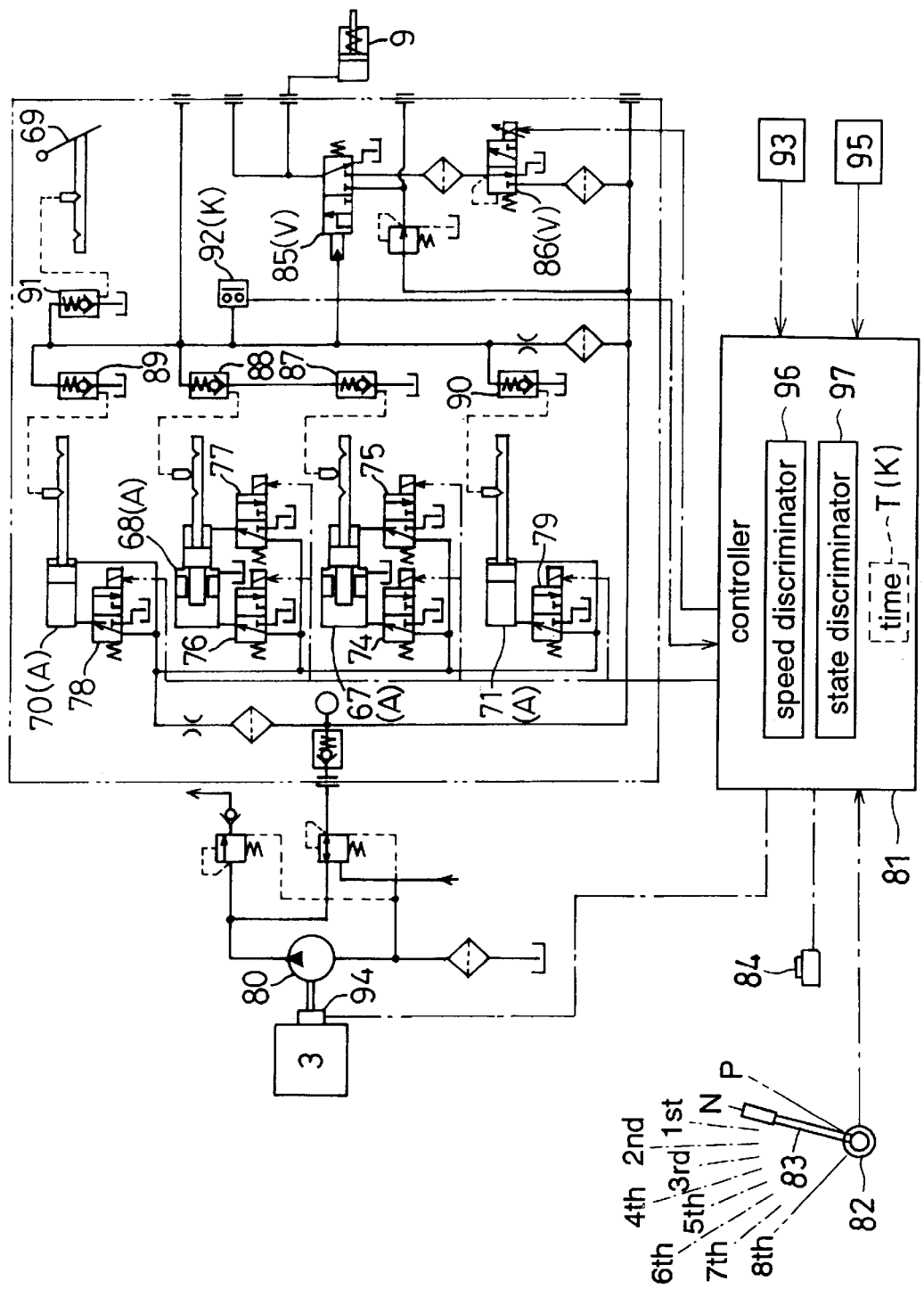
FIG. 3 is a hydraulic control circuit diagram showing a control structure for controlling the propelling change speed system.

Referring to FIGS. 2 and 3, the first shift member 28 of main change speed device 8 is switchable by a first three-position hydraulic cylinder 67. The second shift member 29 of main change speed device 8 is switchable by a second three-position hydraulic cylinder 68. The shift member 36 of forward/backward changeover device 10 is switchable by a first two-position change lever 69. The shift member 41 of supplementary change speed device 11 is switchable by a third two-position hydraulic cylinder 70. The shift member 48 of auxiliary change speed device 12 is switchable by a fourth two-position hydraulic cylinder 71. The shift member 55 of super-reduction device 13 is switchable by a second two-position change lever 72. The shift member 66 of front wheel change speed device 15 is switchable by a fifth three-position hydraulic cylinder 73.

That is, the main change speed device 8, supplementary change speed device 11 and auxiliary change speed device 12 are gear type change speed devices G shiftable by the first to fourth hydraulic cylinders 67, 68, 70 and 71 which are examples of actuators A.

As shown in FIG. 3, the first hydraulic cylinder 67 is operable by a first two-position electromagnetic selector valve 74 and a second two-position electromagnetic selector valve 75. The second hydraulic cylinder 68 is operable by a third two-position electromagnetic selector valve 76 and a fourth two-position electromagnetic selector valve 77. The third hydraulic cylinder 70 is operable by a fifth two-position electromagnetic selector valve 78. The fourth hydraulic cylinder 71 is operable by a sixth two-position electromagnetic selector valve 79. These cylinders are switchable by pressure oil transmitted from a hydraulic pump 80 driven the engine 3. The operation of electromagnetic selector valves 74–79 is controlled by a controller 81 with a microcomputer. The controller 81 controls the first to fourth electromagnetic selector valves 74–77 and sixth electromagnetic selector valve 79 based on control positions of a shift lever 83 detected by a lever sensor 82 in the form of a potentiometer, and controls the fifth electromagnetic selector valve 78 in response to operation of a changeover switch 84.

The control operation of controller 81 based on the control positions of shift lever 83 will particularly be described hereinafter. When the shift lever 83 is in a parking position or a neutral position, the controller 81 supplies pressure oil to the first to fourth electromagnetic selector valves 74–77. Then, these selector valves 74–77 operate the first hydraulic cylinder 67 and second hydraulic cylinder 68 to place the first shift member 28 and second shift member 29 of main change speed device 8 in the neutral positions. This results in a neutral state.

When the shift lever 83 is in a first speed position, pressure oil is drained from the first electromagnetic selector valve 74 and sixth electromagnetic selector valve 79, and supplied to the second to fourth electromagnetic selector valves 75–77. Consequently, the first hydraulic cylinder 67 is operated to place the first shift member 28 of main change speed device 8 in the first speed position. The second hydraulic cylinder 68 is operated to place the second shift member 29 of main change speed device 8 in the neutral position. The fourth hydraulic cylinder 71 is operated to place the shift member 48 of auxiliary change speed device 12 in the low-speed position. This results in a first speed state.

When the shift lever 83 is in a second speed position, pressure oil is drained from the second electromagnetic selector valve 74 and sixth electromagnetic selector valve 79, and supplied to the first electromagnetic selector valve 74, third electromagnetic selector valve 76 and fourth electromagnetic selector valve 77. Consequently, the first hydraulic cylinder 67 is operated to place the first shift member 28 of main change speed device 8 in the second speed position. The second hydraulic cylinder 68 is operated to place the second shift member 29 of main change speed device 8 in the neutral position. The fourth hydraulic cylinder 71 is operated to place the shift member 48 of auxiliary change speed device 12 in the low-speed position. This results in a second speed state.

When the shift lever 83 is in a third speed position, pressure oil is drained from the third electromagnetic selector valve 76 and sixth electromagnetic selector valve 79, and supplied to the first electromagnetic selector valve 74, second electromagnetic selector valve 75 and fourth electromagnetic selector valve 77. Consequently, the first hydraulic cylinder 67 is operated to place the first shift member 28 of main change speed device 8 in the neutral position. The second hydraulic cylinder 68 is operated to place the second shift member 29 of main change speed device 8 in the third speed position. The fourth hydraulic cylinder 71 is operated to place the shift member 48 of auxiliary change speed device 12 in the low-speed position. This results in a third speed state.

When the shift lever 83 is in a fourth speed position, pressure oil is drained from the fourth electromagnetic selector valve 77 and sixth electromagnetic selector valve 79, and supplied to the first to third electromagnetic selector valves 74–76. Consequently, the first hydraulic cylinder 67 is operated to place the first shift member 28 of main change speed device 8 in the neutral position. The second hydraulic cylinder 68 is operated to place the second shift member 29 of main change speed device 8 in the fourth speed position. The fourth hydraulic cylinder 71 is operated to place the shift member 48 of auxiliary change speed device 12 in the low-speed position. This results in a fourth speed state.

When the shift lever 83 is in a fifth speed position, pressure oil is drained from the first electromagnetic selector valve 74, and supplied to the second to fourth electromagnetic selector valves 75–77 and sixth electromagnetic selector valve 79. Consequently, the first hydraulic cylinder 67 is operated to place the first shift member 28 of main change speed device 8 in the first speed position. The second hydraulic cylinder 68 is operated to place the second shift member 29 of main change speed device 8 in the neutral position. The fourth hydraulic cylinder 71 is operated to place the shift member 48 of auxiliary change speed device 12 in the high-speed position. This results in a fifth speed state.

When the shift lever 83 is in a sixth speed position, pressure oil is drained from the second electromagnetic selector valve 75, and supplied to the first electromagnetic selector valve 74, third electromagnetic selector valve 76, fourth electromagnetic selector valve 77 and sixth electromagnetic selector valve 79. Consequently, the first hydraulic cylinder 67 is operated to place the first shift member 28 of main change speed device 8 in the second speed position. The second hydraulic cylinder 68 is operated to place the second shift member 29 of main change speed device 8 in the neutral position. The fourth hydraulic cylinder 71 is operated to place the shift member 48 of auxiliary change speed device 12 in the high-speed position. This results in a sixth speed state.

When the shift lever 83 is in a seventh speed position, pressure oil is drained from the third electromagnetic selector valve 76, and supplied to the first electromagnetic selector valve 74, second electromagnetic selector valve 75, fourth electromagnetic selector valve 77 and sixth electromagnetic selector valve 79. Consequently, the first hydraulic cylinder 67 is operated to place the first shift member 28 of main change speed device 8 in the neutral position. The second hydraulic cylinder 68 is operated to place the second shift member 29 of main change speed device 8 in the third speed position. The fourth hydraulic cylinder 71 is operated to place the shift member 48 of auxiliary change speed device 12 in the high-speed position. This results in a seventh speed state.

When the shift lever 83 is in an eighth speed position, pressure oil is drained from the fourth electromagnetic selector valve 77, and supplied to the first to third electromagnetic selector valves 74–76 and sixth electromagnetic selector valve 79. Consequently, the first hydraulic cylinder 67 is operated to place the first shift member 28 of main change speed device 8 in the neutral position. The second hydraulic cylinder 68 is operated to place the second shift member 29 of main change speed device 8 in the fourth speed position. The fourth hydraulic cylinder 71 is operated to place the shift member 48 of auxiliary change speed device 12 in the high-speed position. This results in an eighth speed state.

That is, based on the control positions of shift lever 83, the controller 81 controls the first to fourth electromagnetic selector valves 74–77 and sixth electromagnetic selector valve 79. The first hydraulic cylinder 67 and second hydraulic cylinder 68 are thereby switched to shift the main change speed device 8, and the fourth hydraulic cylinder 71 is switched to shift the auxiliary change speed device 12. Consequently, eight speeds are provided for each of the forward drive and backward drive.

The control operation of controller 81 based on operation of changeover switch 83 will particularly be described hereinafter.

When the changeover switch 84 is operated with the supplementary change speed device 11 placed in a high-speed forward transmission state, the controller 81 drains pressure oil from the fifth electromagnetic selector valve 78. The third hydraulic cylinder 70 is thereby operated to place the shift member 41 of supplementary change speed device 11 in the low-speed position to produce a low-speed forward transmission state. Conversely, when the changeover switch 84 is operated with the supplementary change speed device 11 in the low-speed forward transmission state, the controller 81 supplies pressure oil to the fifth electromagnetic selector valve 78. The third hydraulic cylinder 70 is thereby operated to place the shift member 41 of supplementary change speed device 11 in the high-speed position to produce the high-speed forward transmission state.

The supplementary change speed device 11 has a gear ratio set to a half of each gear ratio in the eight speed structure of main change speed device 8 and auxiliary change speed device 12. That is, the supplementary change speed device 11 is operable to provide a supplementary change speed approximately corresponding to a half of a main change speed effected by the main change speed device 8 and auxiliary change speed device 12.

The hydraulic circuit for the first to fourth hydraulic cylinder 67, 68, 70 and 71 includes a valve unit V for switching the hydraulic clutch 9 in response to shifting of the main change speed device 8, auxiliary change speed device 12 and supplementary change speed device 11 and operation of forward/backward changeover device 10. The valve unit V includes a selector valve 85 and an electromagnetic proportional valve 86. The electromagnetic proportional valve 86 is connected in series to and upstream of the selector valve 85.

The selector valve 85 is switchable to a pressure oil draining position in response to a start of operation of the first to fourth hydraulic cylinders 67, 68, 70 and 71 or a start of operation of the first change lever 69, to start depressurizing and disengaging the hydraulic clutch 9. Further, the selector valve 85 is switchable to a pressure oil supplying position in response to a finish of operation of the first to fourth hydraulic cylinders 67, 68, 70 and 71 or a finish of operation of the first change lever 69, to start pressurizing and engaging the hydraulic clutch 9.

Figure 4:
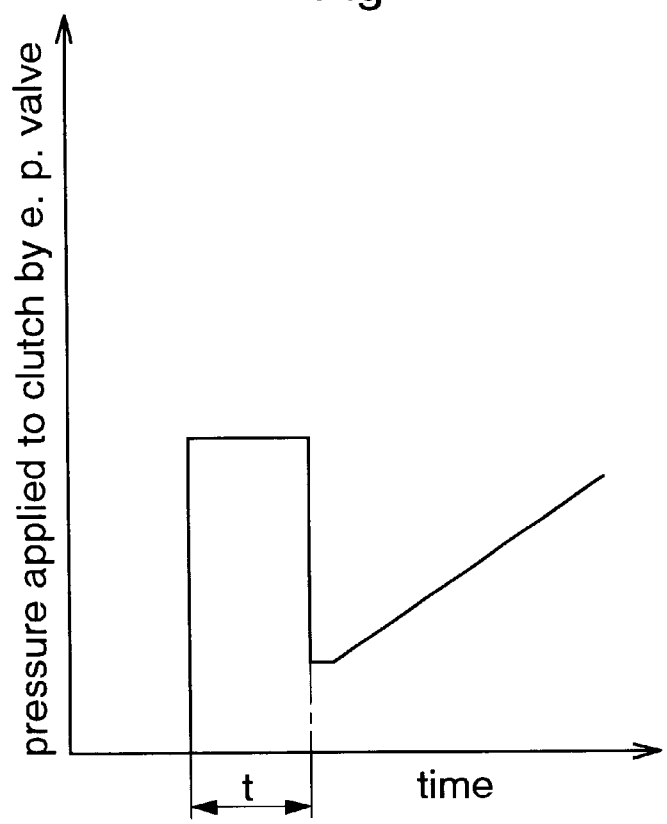
FIG. 4 is a view showing pressures applied to a hydraulic clutch by an electromagnetic proportional valve.

The electromagnetic proportional valve 86 is controlled by the controller 81 to open by a large degree, for a set time t from a start of operation to engage the hydraulic clutch 9, to pressurize the hydraulic clutch 9 in a rapid characteristic curve as shown in FIG. 4, and to open from a small degree to a large degree after the set time t to pressurize the hydraulic clutch 9 in a gentle characteristic curve as shown in FIG. 4. That is, the controller 81 has a function to control the valve unit V to operate the hydraulic clutch 9 with predetermined pressurizing characteristics.

The selector valve 85 is switchable to the pressure oil draining position by a pilot pressure falling below a predetermined pressure, and to the pressure oil supplying position by the pilot pressure rising above the predetermined pressure. These switching operations are based on operations of a first switch valve 87 linked to the first hydraulic cylinder 67 to be closed upon stopping of the first hydraulic cylinder 67 having placed the first shift member 28 of main change speed device 8 in the first speed position or second speed position, a second switch valve 88 linked to the second hydraulic cylinder 68 to be closed upon stopping of the second hydraulic cylinder 68 having placed the second shift member 29 of main change speed device 8 in the third speed position or fourth speed position, a third switch valve 89 linked to the third hydraulic cylinder 70 to be closed upon stopping of the third hydraulic cylinder 70 having placed the shift member 41 of supplementary change speed device 11 in the low-speed position or high-speed position, a fourth switch valve 90 linked to the fourth hydraulic cylinder 71 to be closed upon stopping of the fourth hydraulic cylinder 71 having placed the shift member 48 of auxiliary change speed device 12 in the low-speed position or high-speed position, and a fifth switch valve 91 linked to the first change lever 69 to closed upon stopping of the first change lever 69 having placed the shift member 36 of forward/backward changeover device 10 in the forward position or backward position.

The second switch valve 88 is connected in series to the first switch valve 87, while the third to fifth switch valves 89–91 are connected in parallel to the first switch valve 87. When both of the first switch valve 87 and second switch valve 88 are opened or one of the third to fifth switch valves 89–91 is opened, pressure oil is drained to lower the pilot pressure for the selector valve 85. Conversely, when one of the first switch valve 87 or second switch valve 88 and all of the third to fifth switch valves 89–91 are closed, the draining of pressure oil is stopped to raise the pilot pressure for the selector valve 85.

With the above construction, when the shift lever 83 is operated to shift the main change speed device 8 and auxiliary change speed device 12, the hydraulic clutch 9 may be disengaged automatically in response to a start of operation of the first hydraulic cylinder 67, second hydraulic cylinder 68 or fourth hydraulic cylinder 71. The hydraulic clutch 9 may be engaged automatically in response to a finish of operation of the first hydraulic cylinder 67, second hydraulic cylinder 68 or fourth hydraulic cylinder 71. When the first change lever 69 is operated to switch the forward/backward changeover device 10, the hydraulic clutch 9 may be disengaged automatically in response to a start of operation of the first change lever 69, and engaged automatically in response to a finish of operation of the first change lever 69. When the changeover switch 84 is operated to shift the supplementary change speed device 11, the hydraulic clutch 9 may be disengaged automatically in response to a start of operation of the third hydraulic cylinder 70, and engaged automatically in response to a finish of operation of the third hydraulic cylinder 70.

In short, there is no need to operate the hydraulic clutch 9 manually when shifting the main change speed device 8, supplementary change speed device 11 or auxiliary change speed device 12, or when switching the forward/backward changeover device 10.

As noted hereinbefore, the controller 81 controls the electromagnetic proportional valve 86 to open by a large degree for the set time t from a start of operation to pressurize the hydraulic clutch 9 rapidly. This shortens the time required for engaging the hydraulic clutch 9, compared with the case of opening the electromagnetic proportional valve 86 to pressurize the hydraulic clutch 9 gradually after a start of clutch engaging operation. Moreover, after the set time t, the electromagnetic proportional valve 86 is controlled to pressurize the hydraulic clutch 9 gradually, thereby suppressing a shock in time of clutch engagement. Based on an operation of a pressure switch 92 that detects the pilot pressure reaching a predetermined pressure for switching the selector valve 85, the controller 81 detects a start of disengagement of the hydraulic clutch 9 by a shifting operation of the first to fourth hydraulic cylinders 67, 68, 70 and 71, and a finish of engagement of the hydraulic clutch 9 by the shifting operation of the first to fourth hydraulic cylinders 67, 68, 70 and 71. The set time t is measured by a timer T acting as a time measuring device constructed with software and hardware.

As noted hereinbefore, the first to fourth hydraulic cylinders 67, 68, 70 and 71 are linked to the first to fourth switch valves 87–90. Thus, the longer time the shifting operation by the first to fourth hydraulic cylinders 67, 68, 70 and 71 takes, the longer time is consumed in the disengaging operation of hydraulic clutch 9 by the depressurizing action of valve unit V started with a start of operation of the first to fourth hydraulic cylinders 67, 68, 70 and 71. This increases the quantity of pressure oil drained from the hydraulic clutch 9. A correspondingly increased quantity of pressure oil is needed to operate the hydraulic clutch 9 appropriately until immediately before a clutch engagement during an initial stage of an operation to engage the hydraulic clutch 9 based on the pressuring operation of valve unit V started with a finish of operation of the first to fourth hydraulic cylinders 67, 68, 70 and 71.

Figure 5:
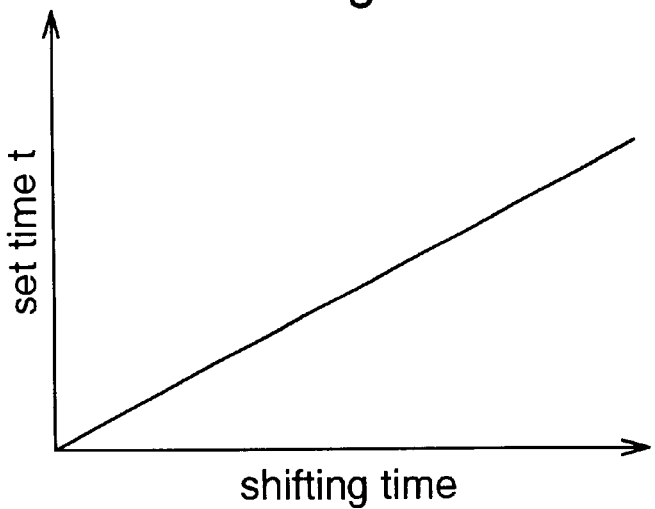
FIG. 5 is a view showing a relationship between set time and shifting time for operating the electromagnetic proportion valve with a rapid pressurization characteristic (with a large opening degree)

Referring to FIGS. 3 and 5, the controller 81 starts the timer T upon detection, based on an operation of pressure switch 92, of a start of operation to disengage the hydraulic clutch 9 with a start of shifting operation by the first to fourth hydraulic cylinders 67, 68, 70 and 71. The controller 81 stops the timer T upon detection of a start of operation to engage the hydraulic clutch 9 with a finish of shifting operation by the first to fourth hydraulic cylinders 67, 68, 70 and 71. In this way, the timer T is operated to measure the time taken by the shifting operation of the first to fourth hydraulic cylinders 67, 68, 70 and 71. Based on the shifting time measured, time t is set for obtaining a required quantity of pressure oil at an initial stage of a subsequent operation to engage the hydraulic clutch 9, for appropriately operating the hydraulic clutch 9 until immediately before a clutch engagement.

That is, the time taken in the shifting operation by the first to fourth hydraulic cylinders 67, 68, 70 and 71 is measured with the pressure switch 92 and timer T. The longer the time taken in the shifting operation is, the more pressure oil is drained from the hydraulic clutch 9. The controller 81 extends the set time t correspondingly for opening the electromagnetic proportional valve 86 with the rapid characteristic (to a large degree). Thus, an increased quantity of pressure oil is obtained during the set time t. The quantity of clutch operating pressure oil (i.e. generation of an appropriate clutch pressure) increased with the length of time of the shifting operation is attained exactly and promptly for appropriately operating the hydraulic clutch 9 until immediately before a clutch engagement. As a result, regardless of variations in the shifting time caused by a difference in speed stage or the like, the time required for engaging the hydraulic clutch 9 may be shortened appropriately, and a shock in time of clutch engagement may be suppressed effectively.

Upon lapse of a predetermined time required to drain all pressure oil from the hydraulic clutch 9, the controller 81 stops the timer K, and varies the set time t to a length for obtaining the quantity of pressure oil (i.e. generation of an appropriate clutch pressure) for appropriately operating the hydraulic clutch 9, completely empty of pressure oil, until immediately before a clutch engagement. This control operation is applied to shifting operations during a run. The controller 81 determines from a detection made by the lever sensor 82 whether a shifting operation is made when starting the tractor or while the tractor is running.

The lower the temperature of pressure oil is, the higher viscosity it has and the more difficult to flow. Thus, in a shifting operation performed when starting the tractor, in which the hydraulic clutch 9 is only engaged by supplying pressure oil to the hydraulic clutch 9 completely empty of pressure oil, the lower the temperature of pressure oil is, the less quantity of pressure oil is supplied to the hydraulic clutch 9 per unit time. As a result, an extended time is required to obtain the quantity of pressure oil for appropriately operating the hydraulic clutch 9 until immediately before a clutch engagement. On the other hand, in a shifting operation performed during a run, which involves an operation to disengage the hydraulic clutch 9 by draining pressure oil therefrom and an operation to engage the hydraulic clutch 9 by supplying pressure oil thereto, the lower the temperature of pressure oil is, the less quantity of pressure oil drained from the hydraulic clutch 9 per unit time and the less quantity of pressure oil is supplied to the hydraulic clutch 9 per unit time. A quick operation is required in disengaging the hydraulic clutch 9. Thus, the valve unit V is opened to a large degree not adjusted by the electromagnetic proportional valve 86. On the other hand, when the hydraulic clutch 9 is engaged, the valve unit V is once adjusted to a small degree by the electromagnetic proportional valve 86 in order to prevent a shock occurring in time of clutch engagement. As a result, the viscosity of pressure oil affects its fluidity more in time of an engaging operation than in time of a disengaging operation. The lower the temperature of pressure oil is, the greater is the difference between the quantity of pressure oil drained from the hydraulic clutch 9 per unit time during an operation to disengage the hydraulic clutch 9 and the quantity of pressure oil supplied to the hydraulic clutch 9 per unit time during an operation to engage the hydraulic clutch 9. An increased quantity of pressure oil is required for appropriately operating the hydraulic clutch 9 until immediately before a clutch engagement.

Figure 6:
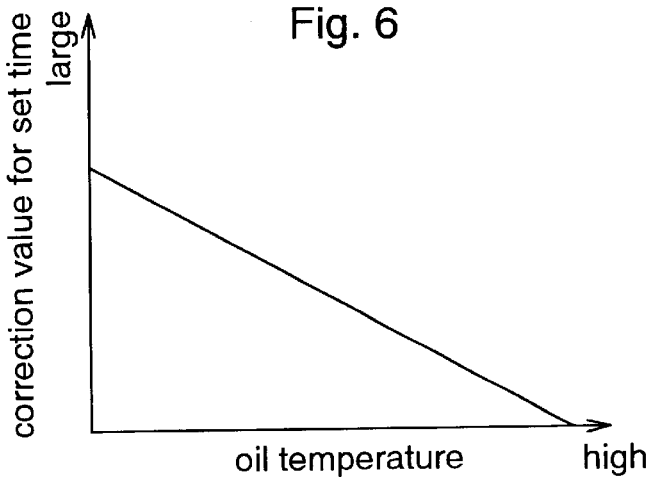
FIG. 6 is a view showing a relationship between set time correction value and oil temperature.

Referring to FIGS. 3 and 6, this tractor includes an oil temperature gauge 93 acting as an oil temperature measuring device for detecting a temperature of pressure oil. Based on the temperature detected by the oil temperature gauge 93, the controller 81 corrects the time t set with reference to the shifting time measured by the time measuring device K.

That is, the lower the temperature of pressure oil detected by the oil temperature gauge 93 is, the controller 81 corrects the set time t to be the longer for increasing the opening degree of electromagnetic proportional valve 86. Regardless of variations in the viscosity of pressure oil due to the temperature thereof, the quantity of pressure oil for appropriately operating the hydraulic clutch 9 until immediately before a clutch engagement is attained exactly and promptly. As a result, the time required for engaging the hydraulic clutch 9 may be shortened appropriately, and a shock in time of clutch engagement may be suppressed with increased effect.

Where only the oil temperature measuring device 93 is provided instead of the time measuring device T, the time t, of course, is set based only on the temperature of oil.

In this tractor, as noted hereinbefore, the hydraulic pump 80 is driven by the engine 3. Thus, the lower the engine speed is, the hydraulic pump 80 delivers pressure oil at the lower flow rate. An extended time is required to obtain the quantity of pressure oil at an initial stage of a subsequent operation to engage the hydraulic clutch 9, for appropriately operating the hydraulic clutch 9 until immediately before a clutch engagement.

Figure 7:
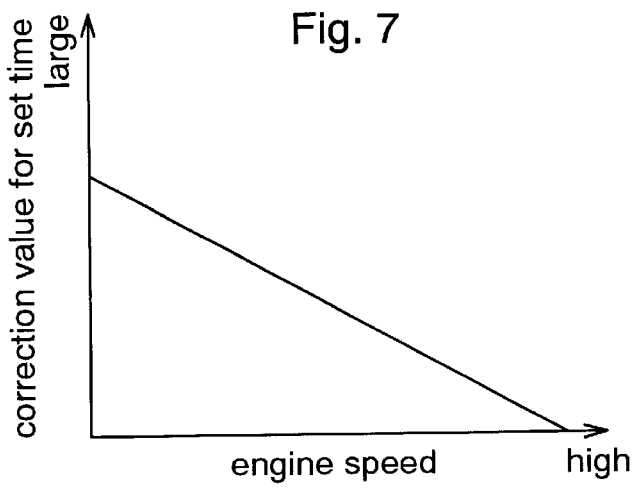
FIG. 7 is a view showing a relationship between set time correction value and engine speed.

Referring to FIGS. 3 and 7, this tractor includes a tachometer 94 acting as a speed measuring device for detecting a speed of engine 3. Based on the engine speed detected by the tachometer 94 as well as the temperature detected by the oil temperature gauge 93, the controller 81 corrects the time t set with reference to the shifting time measured by the time measuring device K.

That is, the lower the engine speed detected by the tachometer 94 is, the controller 81 corrects the set time t to be the longer for increasing the opening degree of electromagnetic proportional valve 86. Regardless of variations in the flow rate of pressure oil due to the engine speed, the quantity of pressure oil for appropriately operating the hydraulic clutch 9 until immediately before a clutch engagement is attained exactly and promptly. As a result, the time required for engaging the hydraulic clutch 9 may be shortened appropriately, and a shock in time of clutch engagement may be suppressed with increased effect.

Where only the speed measuring device 94 is provided instead of the time measuring device T, the time t, of course, is set based only on the engine speed. Further, time t may be set based on at least two of the time taken in shifting the gear type change speed devices G, the temperature of pressure oil and engine speed In short, based on the shifting time detected, the viscosity of pressure oil determined from the temperature of pressure oil, and the flow rate of pressure oil from the hydraulic pump 80, the controller 81 sets time t for increasing the opening degree of electromagnetic proportional valve 86 to a length for obtaining the required quantity of pressure oil. Consequently, after a shifting operation by the first to fourth hydraulic cylinders 67, 68, 70 and 71, the hydraulic clutch 9 may be engaged appropriately by taking into account the shifting time detected, the viscosity of pressure oil determined from the temperature of pressure oil, and the flow rate of pressure oil from the hydraulic pump 80.

Figure 8:
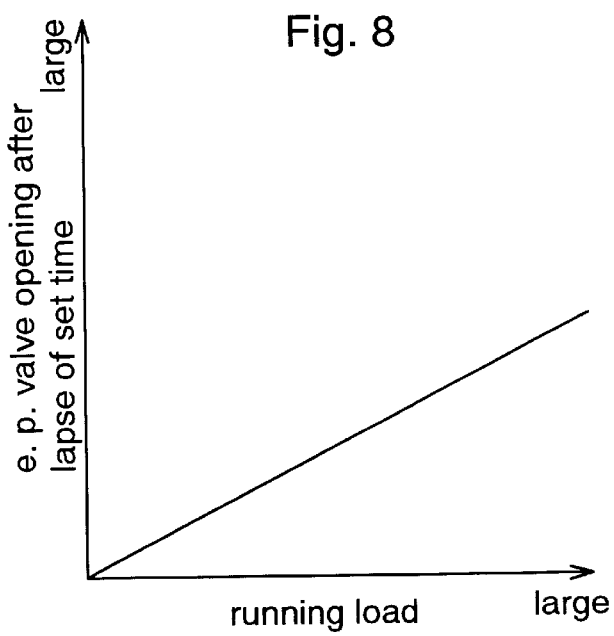
FIG. 8 is a view showing a relationship between opening degree of the electromagnetic proportional valve after the set time and running load.

Referring to FIGS. 3 and 8, this tractor includes a rotation sensor 95 for detecting the number of rotations of rear wheels 2. The controller 81 derives a running speed from a detection value provided by the rotation sensor 95, and detects a running load from a decrease in the running speed in time of disengagement of the hydraulic clutch 9. Based on the running load, the controller 81 varies the opening degree of electromagnetic proportional valve 86 after the set time t in time of disengagement of the hydraulic clutch 9, to vary the pressurizing characteristic after the set time t.

That is, the larger the running load is, the higher is a pressure value for the hydraulic clutch 9 to start transmission when the hydraulic clutch 9 is engaged. The greater the decrease is in the running speed derived from the detection value in time of disengagement of the hydraulic clutch 9, the controller 81 determines that the running load is the greater, and correspondingly increases the opening degree of electromagnetic proportional valve 86. The pressure value increased with the running load may thereby be attained easily for allowing the hydraulic clutch 9 to start transmission. As a result, regardless of running loads, the time required until the hydraulic clutch 9 starts transmission may be shortened appropriately, and a shock in time of clutch engagement may be suppressed with increased effect.

It is conceivable to detect a running load from a decrease in the engine speed detected by the tachometer 94. However, a decrease in the engine speed is caused by a running load and an operational load occurring when driving a working implement connected to the tractor. During an operational run with the working implement driven, a running load alone cannot be detected from a decrease in the engine speed. The hydraulic clutch 9 cannot be pressurized appropriately according to a running load. A shifting operation performed during a run produces a shock in time of clutch engagement. In this embodiment, a running load alone may be detected also during an operational run by detecting the running load from a decrease in the running speed occurring when the clutch 9 is disengaged. Whether operational run or non-operational run, the time required until the hydraulic clutch 9 starts transmission may be shortened appropriately, and a shock in time of clutch engagement may be suppressed with increased effect.

[Second Embodiment]

In the second embodiment of this invention, as shown in FIGS. 3 and 9, the controller 81 opens the electromagnetic proportional valve 86 when the pressure switch 92 detects the pilot pressure lowering to the predetermined pressure, that is when the selector valve 85 is switched to the pressure oil draining position to start disengaging the hydraulic clutch 9, upon start of operation of the first to fourth hydraulic cylinders 67, 68, 70 and 71 or upon start of operation of the first change lever 69. Based on shifting conditions at this time, such as a speed stage, the temperature of pressure oil, engine speed, and whether the tractor is started or already running, the controller 81 varies the pressuring characteristic for the hydraulic clutch 9 produced by the electromagnetic proportional valve 86 at this stage.

Specifically, the controller 81 includes a speed discriminating device 96 and a state discriminating device 97 provided by a program. The speed discriminating device 96 determines a speed stage from a detection by the lever sensor 82 or an operation of changeover switch 84. The state discriminating device 97 determines from a detection by the lever sensor 82 whether tractor is started or already running. The tractor includes an oil temperature gauge 93 for detecting a temperature of pressure oil, and a tachometer 94 for detecting a speed of engine 3 which drives the hydraulic pump 80. The controller 81 determines the viscosity of pressure oil from a detection by the oil temperature gauge 93, and the quantity of pressure oil fed from the hydraulic pump 80 from a detection by the tachometer 94. Based on the viscosity and flow rate determined, the controller 81 varies the pressurizing characteristic for the hydraulic clutch 9 produced by the electromagnetic proportional valve 86 when a disengagement of hydraulic clutch 9 is started.

For example, a certain speed stage may require a different shifting time due to differences in solid structure or shift stroke among the first to fourth hydraulic cylinders 67, 68, 70 and 71 and the number cylinders operated. Then, a different quantity of pressure oil is drained from the hydraulic clutch 9 during the shifting operation. As a result, a different quantity of pressure oil is needed for engaging the hydraulic clutch 9. The larger the quantity of pressure oil is drained from the hydraulic clutch 9 during an operation for shifting to the speed determined from a detection by the lever sensor 82 or an operation of changeover switch 84, the controller 81 sets the more rapid target pressurizing characteristic (i.e. the larger opening degree) of electromagnetic proportional valve 86, when the disengagement of hydraulic clutch 9 is started in the shifting operation, to increase the quantity of pressure oil supplied to the hydraulic clutch 9 per unit time. Thus, regardless of speed stages, a sufficient quantity of pressure oil is secured during the set time t for appropriately operating the hydraulic clutch 9 until immediately before a clutch engagement.

In a shifting operation performed during a run, the first switch valve 87 and second switch valve 88 are opened only when the shift lever 83 is operated from one to a next one of the first to eighth speed positions. Thus, pressure oil is supplied to the hydraulic clutch 9 not completely empty of pressure oil. In a shifting operation performed when starting the tractor, the shift lever 83 is already placed in the parking position or neutral position to keep the first switch valve 87 and second switch valve 88 open. Thus, pressure oil is supplied to the hydraulic clutch 9 completely empty of pressure oil. When it is determined that a shifting operation is performed when starting the tractor, the controller 81 sets a more rapid target pressurizing characteristic (i.e. a larger opening degree) of electromagnetic proportional valve 86, when the disengagement of hydraulic clutch 9 is started, than for a shifting operation performed during a run, to increase the quantity of pressure oil supplied to the hydraulic clutch 9 per unit time. Thus, also in time of starting the tractor, a sufficient quantity of pressure oil is secured during the set time t for appropriately operating the hydraulic clutch 9 until immediately before a clutch engagement.

In addition, the lower the temperature of pressure oil is, the higher viscosity it has and the more difficult to flow. A quick operation is required in disengaging the hydraulic clutch 9. Thus, the valve unit V is opened to a large degree not adjusted by the electromagnetic proportional valve 86. On the other hand, when the hydraulic clutch 9 is engaged, the valve unit V is once adjusted to a small degree by the electromagnetic proportional valve 86 in order to prevent a shock occurring in time of clutch engagement. As a result, the viscosity of pressure oil has a great influence in time of an engaging operation. The lower the temperature of pressure oil is as detected by the oil temperature gauge 93, the controller 81 sets the more rapid target pressurizing characteristic (i.e. the larger opening degree) of electromagnetic proportional valve 86, when the disengagement of hydraulic clutch 9 is started, to allow pressure oil to flow easily to the hydraulic clutch 9. Thus, regardless of the viscosity of pressure oil, a sufficient quantity of pressure oil is secured during the set time t for appropriately operating the hydraulic clutch 9 until immediately before a clutch engagement.

In addition, the lower the engine speed is, the hydraulic pump 80 delivers pressure oil at the lower flow rate. The lower the engine speed is as detected by the tachometer 94, the controller 81 sets the more rapid target pressurizing characteristic (i.e. the larger opening degree) of electromagnetic proportional valve 86, when the disengagement of hydraulic clutch 9 is started, to allow pressure oil to flow easily to the hydraulic clutch 9. Thus, regardless of the engine speed, a sufficient quantity of pressure oil is secured during the set time t for appropriately operating the hydraulic clutch 9 until immediately before a clutch engagement.

From the above, the hydraulic clutch 9 is reliably operated, during the set time t, until immediately before a clutch engagement regardless of variations in the quantity of pressure oil supplied from the hydraulic pump 80 caused by a speed stage, whether the tractor is started or is running, the temperature of pressure oil, and engine speed. As a result, various inconveniences as set out below may be avoided. Depending on a speed stage, the temperature of pressure oil and engine speed, the hydraulic clutch 9 cannot be operated reliably, during the set time t, until immediately before a clutch engagement. With the opening degree of electromagnetic proportional valve 86 restricted from a stage considerably before a clutch engagement, an extended dead time occurs from completion of a shifting operation when the operation of the first to fourth hydraulic cylinders 67, 68, 70 and 71 ends to a clutch engagement. A shock is produced by an engagement of hydraulic clutch 9 occurring during the set time t when the electromagnetic proportional valve 86 is opened by a large degree. In time of starting the tractor, the hydraulic clutch 9 cannot be operated reliably, during the set time t, until immediately before a clutch engagement, and with the opening degree of electromagnetic proportional valve 86 restricted from a stage considerably before the clutch engagement, an extended dead time occurs from completion of a shifting operation when the operation of the first hydraulic cylinders 67 ends to the clutch engagement.

Moreover, the controller 81 opens the electromagnetic proportional valve 86 at the stage where the disengagement of hydraulic clutch 9 is started. When the selector valve 85 is switched to the pressure oil supplying position to engage the hydraulic clutch 9 in response to an end of operation of the first to fourth hydraulic cylinders 67, 68, 70 and 71, the electromagnetic proportional valve 86 has already been adjusted to a rapid pressure characteristic (large opening degree) corresponding to the shift conditions of that time. As a result, the hydraulic clutch 9 is immediately supplied with pressure oil at a high flow rate corresponding to the opening degree of electromagnetic proportional valve 86. Thus, the quantity of pressure oil to be supplied to the hydraulic clutch 9 is not limited while the electromagnetic proportional valve 86 is opened, which is the case when the electromagnetic proportional valve 86 is opened after switching the selector valve 85 to the pressure oil supplying position. A correspondingly reduced dead time occurs from completion of a shifting operation when the operation of the first to fourth hydraulic cylinders 67, 68, 70 and 71 ends to the clutch engagement. A reduction in vehicle speed in time of a shifting operation may be suppressed, effectively to suppress a shock occurring in time of a clutch engagement.

The second embodiment may be modified as follows:

(1) The controller 81 may open the electromagnetic proportional valve 86 at any time before a finish of operation of the actuator A.
(2) The controller 81 may vary the target pressure characteristic for the electromagnetic proportional valve 86 before a finish of operation of the actuator A based on one of the speed stage, whether the tractor is started or is running, the temperature of pressure oil, and engine speed, or a combination of two or more of these conditions.
(3) A plurality of detecting devices such as limit switches may be provided for detecting a start and finish of operation of the first to fourth hydraulic cylinders 67, 68, 70 and 71. The selector valve 85 may be the electromagnetic type operable under control of the controller 81 effected in response to detections by these detecting devices.

[Third Embodiment]

In the third embodiment of this invention, as shown in FIG. 10, the controller 81 has a function, when throttling the electromagnetic proportional valve 86 immediately after the set time t, once to reduce current value a for opening the electromagnetic proportional valve 86 to zero below current value b for adjusting an opening degree of electromagnetic proportional valve 86 to a target opening degree to obtain an appropriate engaging pressure for the hydraulic clutch 9, and thereafter to increase current value a gradually.

By reducing current value a for opening the electromagnetic proportional valve 86 to zero immediately after the set time t, a maximum operating force is applied to throttle the electromagnetic proportional valve 86 immediately after the set time t. A sufficient force is thereby secured to act against the spool of electromagnetic proportional valve 86 sticking to a valve wall due to the viscosity of oil during the set time t for increasing the opening degree of electromagnetic proportional valve 86. Consequently, the electromagnetic proportional valve 86 may be throttled promptly immediately after the set time t. The hydraulic clutch 9 may be engaged when the electromagnetic proportional valve 86 is throttled to the target opening degree to obtain an appropriate clutch engaging pressure. This avoids an inconvenience that the hydraulic clutch 9 is engaged to generate a shock at a stage where a large quantity of pressure oil is supplied to the hydraulic clutch 9 in the course of throttling the electromagnetic proportional valve 86 from a large opening degree to the target opening degree. Such an inconvenience would take place when the operation to throttle the electromagnetic proportional valve 86 immediately after the set time t is delayed by the spool of electromagnetic proportional valve 86 sticking to the valve wall due to the viscosity of oil.

For example, a shifting operation may be performed while the tractor is running in a plowing operation with a plowing implement, not shown, is connected to the tractor. When the hydraulic clutch 9 is disengaged in time of the shifting operation, the tractor could be pushed by the plowing implement to dash. In another case, a shifting operation may be performed while the tractor is pulling a trailer downhill. Then, when the hydraulic clutch 9 is disengaged in time of the shifting operation, the tractor could be pushed and accelerated by the trailer, to render a gear engagement impossible.

Figure 11:
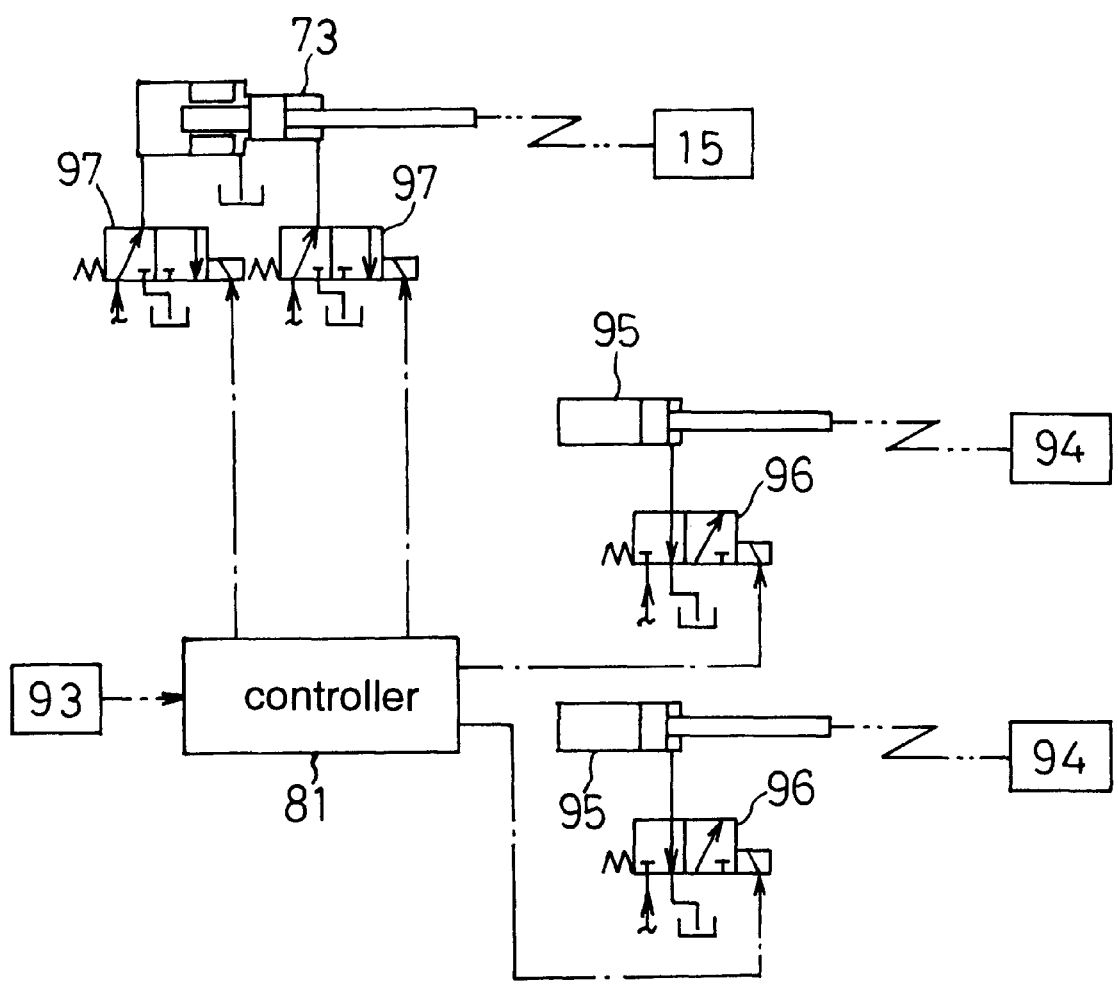
FIG. 11 is a hydraulic control circuit diagram showing a control operation in time of acceleration with the clutch disengaged.

To cope with such situations, as shown in FIG. 11, the controller 81 monitors variations in the vehicle speed occurring with disengagement of hydraulic clutch 9 based on detection values received from a rotation sensor 93 that detects the number of rotations of rear wheels 2. Upon increase in the running speed, the controller 81 starts an operation of right and left side hydraulically operable brakes 94 mounted on transmission lines from the rear differential 14 to the right and left rear wheels 2. When the front wheel change speed device 15 is in the rear wheel drive state, the controller 81 switches the change speed device 15 to the standard four wheel drive, to adjust the running speed to a speed corresponding to a next speed stage. This avoids the inconvenience of dashing of the tractor or the incapability of gear engagement. Numeral 95 in FIG. 11 denotes hydraulic cylinders for operating the right and left side brakes 94.

Numeral 96 denotes electromagnetic proportional valves for controlling the respective hydraulic cylinders 95. Numeral 97 denotes a pair of electromagnetic selector valves for controlling a fifth hydraulic cylinder 73 that operates the front wheel change speed device 15.

The valve opening current value a supplied by the controller 81 to the electromagnetic proportional valve 86 immediately after the set time t is variable as long as it is below the current value b for adjusting the opening degree of electromagnetic proportional valve 86 to the target opening degree to obtain an appropriate engaging pressure for the hydraulic clutch 9.

[Fourth Embodiment]

In the three embodiments described hereinbefore, the change speed devices are the synchromesh type operable by the hydraulic actuators. Instead, the change speed devices may be the type having gear sets operable by hydraulic clutches. With this type of change speed devices, the hydraulic control according to this invention may suitably be applied particularly to operation of a forward/backward changeover hydraulic clutch. The subject matter of this invention is to optimize the hydraulic control of the hydraulic clutch for breaking drive transmission when shifting the change speed devices.

What is claim is:

1. A hydraulic change speed system for a working vehicle comprising:

an engine;

a gear type change speed device provided on a power transmission line from said engine, said gear type change speed device including a first gear change speed device disposed adjacent to said engine on the power transmission line, and a second gear change speed device disposed downstream of said first gear change speed device on the power transmission line; said first gear change speed device including a first shifter for changing speed stages thereof, a first actuator for shifting said first shifter, and a first valve for actuating said first actuator; said second gear change speed device including a second shifter for changing speed stages thereof, a second actuator for shifting said second shifter, and a second valve for actuating said second actuator, wherein the first actuator and the second actuator each have a start and a finish;

a hydraulic clutch disposed between said first gear change speed device and said second gear change device on the power transmission line; said hydraulic clutch being switchable between a first state permitting the engine power transmission from said first gear speed change device to said second gear speed change device, and a second state breaking this engine power transmission; said hydraulic clutch being depressurized and switched to said second state when at least one of said first actuator and said second actuator effects shifting of said first shifter or said second shifter, and being pressurized and returned to said first state upon finish of the shifting of said first shifter or said second shifter;

a third valve effecting pressurizing and depressurizing of said hydraulic clutch; and a controller operable to depressurize said hydraulic clutch by means of said third valve in response to the start of the shifting by said first actuator or said second actuator, and operable to pressurize said hydraulic clutch by means of said third valve in response to the finish of the shifting by said first actuator or said second actuator; said controller including a first control characteristics having a larger pressure raise of said hydraulic clutch per unit time, and a second control characteristics having a smaller pressure raise of said hydraulic clutch per unit time;

a time measuring device measuring a shifting time of said first actuator and said second actuator from the start to the finish of the shifting of these actuators;

wherein, when said controller causes said hydraulic clutch to return from said second state to said first state after the finish of the shifting of said first actuator and said second actuator, said controller uses said first control characteristics during a preset period of time to effect a pressure raise of said hydraulic clutch, and uses said second control characteristics to effect the pressure raise of said hydraulic clutch upon lapse of said preset period of time; and wherein a duration of said preset period of time during which said first control characteristics lasts is determined based on the shifting time measured by said time measuring device.

2. A hydraulic change speed system for a working vehicle according to claim 1, wherein said period of time is set for obtaining a required quantity of pressure oil by means of said third valve to operate said hydraulic clutch until immediately before a clutch engagement.

3. A hydraulic change speed system according to claim 2, further comprising an oil temperature measuring device for detecting a temperature of pressure oil in said hydraulic change speed system, said controller being operable to correct said set period of time based on said temperature detected.

4. A hydraulic change speed system for a working vehicle as defined in claim 2, further comprising:
- a hydraulic pump driven by said engine to produce a hydraulic pressure for said hydraulic change speed system; and
- a speed measuring device for detecting a speed of said engine, said controller is being operable to correct said set period of time based on said speed detected.

* * * * *